United States Patent
Nakajima et al.

(10) Patent No.: US 6,487,820 B1
(45) Date of Patent: Dec. 3, 2002

(54) SEALS FOR VEHICLES

(75) Inventors: Takao Nakajima, Inazawa (JP);
Masanori Aritake, Ichinomiya (JP);
Atsushi Sumida, Nagoya (JP);
Hidetaka Fukamachi, Komaki (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/493,184

(22) Filed: Jan. 28, 2000

(30) Foreign Application Priority Data

Mar. 30, 1999 (JP) ............................................ 11-280096
Mar. 31, 1999 (JP) ............................................ 11-092118

(51) Int. Cl.⁷ ................................................ E06B 7/16
(52) U.S. Cl. .................... 49/490.1; 49/475.1; 49/498.1; 428/122; 428/99; 428/492
(58) Field of Search .................. 428/122, 492, 428/99; 49/490.1, 498.1, 475.1

(56) References Cited

U.S. PATENT DOCUMENTS

| | | |
|---|---|---|
| 4,676,856 A | 6/1987 | Shigeki et al. |
| 5,123,988 A | 6/1992 | Iwasa |
| 5,147,105 A | 9/1992 | Ono et al. |
| 5,279,782 A | 1/1994 | Yamamoto et al. |
| 5,403,632 A | 4/1995 | Mesnel et al. |
| 5,489,461 A | 2/1996 | Iwasa et al. |
| 5,690,768 A | 11/1997 | Iwasa et al. |

FOREIGN PATENT DOCUMENTS

| | | |
|---|---|---|
| EP | 0209453 | 1/1987 |
| EP | 822 052 | 2/1998 |
| FR | 2 492 939 | 4/1982 |

*Primary Examiner*—Alexander S. Thomas
(74) *Attorney, Agent, or Firm*—Pillsbury Winthrop LLP

(57) ABSTRACT

A vehicle has a movable member movably disposed in an opening to close or open the opening. The seal is mounted to one of the movable member and an inner edge surrounding the opening conforming to each other. The seal has a seal portion subject to elastic deformation when being pressed against the movable member or the inner edge. The seal portion is made of a vulcanizable rubber. A base portion is made of a thermoplastic elastomer. The seal portion and the base portion are integrated by coextrusion. The rubber of the seal portion is vulcanized when passing through a vulcanizer.

15 Claims, 10 Drawing Sheets

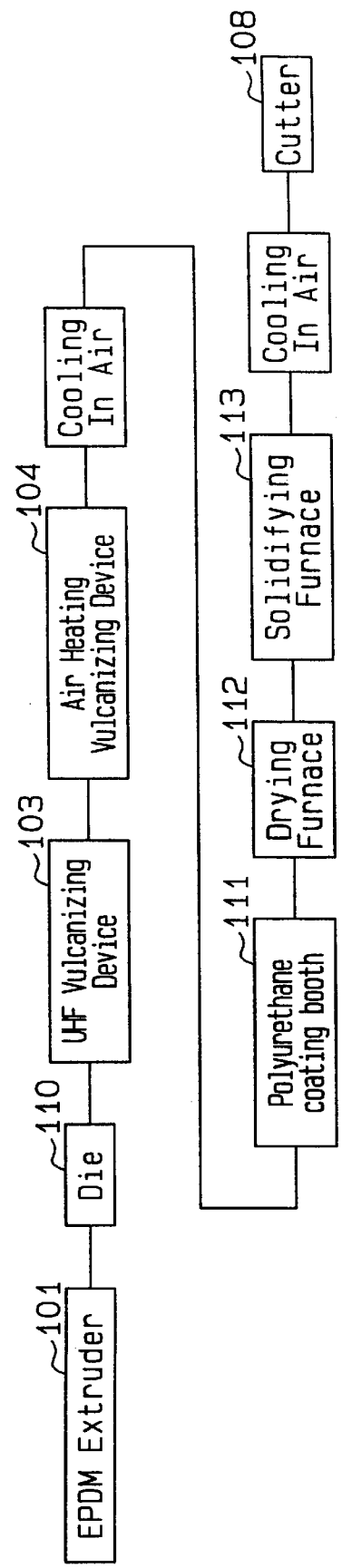

SEALS FOR VEHICLES

BACKGROUND OF THE INVENTION

1. Field of the Invention

The present invention relates to seals used in vehicles, such as weather strips, and, more particularly, to procedures and facilities for manufacturing these seals.

2. Description of Related Art

Weather strips are used for sealing automobile passenger compartments to prevent rain, washing water, mud, noise and the like from entering the passenger compartment. Opening trim (OT) weather strips (hereafter referred to as "OT weather strips") and door weather strips seal a space defined between the doors and the body panels located adjacent to the doors. Door glass run channels seal a space between the door frames and the door glasses moving along the door frames.

A typical OT weather strip includes a U-shaped trim and a tubular seal formed integrally with the trim. The trim is secured to a peripheral flange of a door opening of a body panel. Since the trim is required to have a predetermined degree of strength, the trim is formed by embedding a metal core with ethylene-propylene-diene copolymer (EPDM), solid rubber. The outer side of the trim is covered by a decorating layer formed of, for example, thermoplastic elastomer (TPE). It is also required that the seal has an elastic property at the low-temperature. The sealing is thus formed of EPDM sponge rubber.

FIG. 11 shows a conventional-type procedure for manufacturing the OT weather strip. Specifically, a supplier 106 supplies a plate-like metal core to an EPDM solid rubber extruder 101. The metal core is then embedded by unvulcanized solid rubber and supplied to a first die 102. Meanwhile, an EPDM sponge rubber extruder 100 supplies unvulcanized EPDM sponge rubber to the first die 102. The sponge rubber, together with the solid rubber embedding the metal core, is extruded through the first die 102 and formed as one body, or a workpiece having a predetermined shape. The workpiece including unvulcanized rubber is sent to a microwave heating vulcanizing device (UHF device) 103 in which the workpiece is pre-heated. While the workpiece is passing through the UHF device 103, a foaming agent contained in the EPDM sponge rubber activates and starts foaming the rubber. The workpiece is then sent to an air heating vulcanizing furnace 104. By passing the workpiece through the air heating vulcanizing furnace 104, the EPDM rubber is completely vulcanized. The workpiece including the vulcanized rubber is then cooled in the air.

Meanwhile, olefine type thermoplastic elastomer (TPO) used for forming the decorating layer of the trim is molten in a TPO extruder 105. The molten TPO is shaped like a sheet by second die 107 through extrusion molding. Then, the sheet-like TPO is press-fit on the workpiece by a roller. In this manner, the outer side of the trim is covered by a TPO decorating layer. Subsequently, the workpiece is again cooled in the air and bent such that the trim has a U-shaped cross section. The bent workpiece is then cut in a plurality of pieces by a cutter 108. The cut pieces are arranged in a cavity defined in a metal mold such that the pieces are separate from one another while inclined relative to one another by predetermined angles. EPDM sponge rubber is then injected in the cavity and connects the cut pieces with one another. A complete OT weather strip is thus obtained.

In the above conventional-type procedure, the rubber material and TPO may be shaped as one body through co-extrusion molding, instead of shaping TPO separately. In this case, the second die 107 is unnecessary. However, since the vulcanizing temperature of the rubber is normally 180° C. to 220° C. TPO is re-molten in a vulcanizing device in which the rubber is vulcanized. The re-molten TPO affects the appearance of the weather strip. Accordingly, as described above, TPO and the rubber must be treated separately before the shaped TPO is press-fit on the vulcanized rubber material.

Furthermore, in the above procedure, the trim formed of vulcanized rubber may be placed in the second die 107. The molten TPO is then arranged on the trim in the second die 107 such that the trim is covered by the decorating layer. However, in this case, it is very difficult to supply the trim to the second die 107 at a predetermined position. As a result, the obtained TPO decorating layer does not have a uniform thickness. In addition, if the molten TPO needs to be provided only to a certain portion of the trim, the structure of the second die 107 becomes extremely complicated. The manufacturing costs of the OT weather strip is thus increased. Therefore, in order to reduce the manufacture costs, a second die 107 with a simple structure is used in the conventional-type procedure. However, if TPO is shaped like a sheet by the second die 107, the sheet-like TPO must be independently press-fit on the workpiece after the rubber vulcanization is completed. This press-fitting step complicates the procedure for manufacturing the OT weather strip. Accordingly, it is necessary to provide a procedure for manufacturing a weather strip capable of reducing costs and of simple performance.

A typical door glass run channel has a bottom wall, a pair of side walls, a pair of support lips, and a pair of lip seals. The support lips and the lip seals extend from the distal ends of the associated side walls. The support lips clamp an edge of a door frame that defines an opening in the door frame for receiving a door glass. Each lip seal comes in contact with an inner side of the door glass facing the passenger compartment or an outer side of the door glass facing the exterior of the vehicle. The lip seals are opposed to each other such that the lip seals guide the door glass to move smoothly along the door frame. When a door glass is closed, the lip seals come in contact with the inner and outer sides of the door glass for sealing the passenger compartment, or preventing rain, washing water, mud, noise and the like from entering the passenger compartment. Most of the door glass run channel is formed of a single type of material, such as EPDM solid rubber and TPO. A polyurethane layer is applied on the surfaces of the lip seals and other portions of the door glass run channel coming in contact with the door glass. The polyurethane resin layer allows the door glass to slide smoothly along the door glass run channel.

FIG. 12 shows a conventional-type procedure for manufacturing the door glass run channel. An EPDM extruder 101 supplies unvulcanized EPDM solid rubber to a die 110. The EPDM solid rubber is then shaped in a predetermined shape by the die 110 through extrusion molding. The shaped rubber is sent to a UHF vulcanizing device 103 and then to an air heating vulcanizing furnace 104 in which the rubber is vulcanized. The rubber is then cooled in the air such that a workpiece of the door glass run channel is obtained.

Next, the workpiece is sent to a polyurethane coating booth 111 in which a solution of polyurethane is applied and coated on the workpiece. The workpiece is then passed through a drying furnace 112 in which solvent contained in the solution is evaporated. Subsequently, the workpiece is sent to a solidifying furnace 113 and solidified in the furnace 113. The workpiece is then cooled and cut in a plurality of pieces by a cutter 108. The cut pieces are arranged in cavity defined in a metal mold such that the pieces are separate from one another and inclined relative to one another by predetermined angles. The pieces are then connected with one another by EPDM solid rubber or TPO injected in the cavity. A complete door glass run channel is thus obtained.

The above procedure includes an independent step of applying a polyurethane coating on the lip seals and another independent step of solidifying the polyurethane. These steps prolong the time required for performing the procedure for manufacturing the door glass run channel. Furthermore, the steps for forming the polyurethane layer complicate the procedure and thus increase the cost for manufacturing the door glass run channel.

Furthermore, since most part of the door glass run channel is formed of EPDM solid rubber, the door glass run channel becomes heavier. Since it is required to provide lighter automobiles, lighter automobile parts need be manufactured. In order to meet this need, for example, the volume of each section in the door glass run channel may be reduced. However, it is difficult to reduce the volume of each section in the door glass run channel without hampering its clamping of the door frame and sealing of the passenger compartment. In addition, if most of the door glass run channel is formed of TPO, the door glass run channel becomes lighter. However, the lip seals of the glass run channel become solidity at a low temperature, thus decreasing its elastic property.

A typical door weather strip includes a base and a hollow seal formed integrally with the base. The base is supported by a retainer fixed on an outer edge of a door frame. The door weather strip is formed of a singe material, such as EPDM rubber and TPO. Normally, the base and the seal are formed of EPDM sponge rubber as one body.

Since the entire door weather strip is formed of EPDM sponge rubber, it is difficult to attach the base to the retainer of the door frame in a stable manner. Thus, the door weather strip may be attached to the door frame by a synthetic resin clamp inserted through a hole defined in the base. In this case, the base may be damaged due to its insufficient rigidity, thus causing the door weather strip to fall from the door frame. However, if the door weather strip is formed of TPO such that the rigidity of the base is increased, the elastic property including permanent compression set of the hollow seal is extremely lowered as compared with a seal formed of sponge rubber. Furthermore, the elastic property of the seal formed of TPO is decreased when exposed to a low temperature. The door weather strip formed of TPO is thus not yet in use.

SUMMARY OF THE INVENTION

It is an objective of the present invention to provide a relatively light and inexpensive seal used in a vehicle without degrading the sealing and anti-wear characteristics of the entire seal.

To achieve the foregoing and other objectives and in accordance with the purpose of the present invention, a seal for a vehicle is provided. The vehicle includes an opening of a body and a movable member movably disposed in the opening to selectively close and open the opening. The movable member has an outer edge and the opening is defined by a peripheral inner edge of a flange of the body. The seal is mounted to one of the outer edge of the movable member and the inner edge of the body conforming to each other. The seal has a first portion subject to an elastic deformation when being pressed against one of the movable member and the body. The first portion is made of a vulcanizable rubber. The seal includes a second portion made of a thermoplastic elastomer. The first portion and at least a part of the second portion are integrated by coextrusion. The rubber of the first portion is vulcanized when passing through a vulcanizer.

The present invention is also applied to a method for manufacturing seal for a vehicle. The vehicle has an opening and a movable member movably disposed in the opening to selectively close and open the opening. The movable member has an outer edge and the body has the opening defined by an inner edge of a flange. The seal is attached to one of the outer edge of the movable member and the flange of the body conforming to each other. The seal has a first portion subject to a plastic deformation when being pressed against the movable member or the body. The method includes extruding a rubber for forming the first portion; extruding a thermoplastic elastomer for forming at least a part of a second portion different from the first portion; coextruding the rubber and the thermoplastic elastomer which were formed as one body to a predetermined shape in a single die; and vulcanizing the rubber in a vulcanizer that is heated to a predetermined temperature.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 10(*b*) is a graph showing the temperature variations of EPDM and TPO in a workpiece of the door glass run channel during the procedure shown in FIG. 8;

FIG. 12 is a diagram explaining a conventional-type procedure for forming a door glass run channel.

DETAILED DESCRIPTION OF THE CURRENTLY PREFERRED EMBODIMENTS OF THE PRESENT INVENTION

A first embodiment of the present invention, or an opening trim weather strip (hereafter referred to as "OT weather strip") 31, will now be described with reference to FIGS. 1 to 4.

Figure 1:
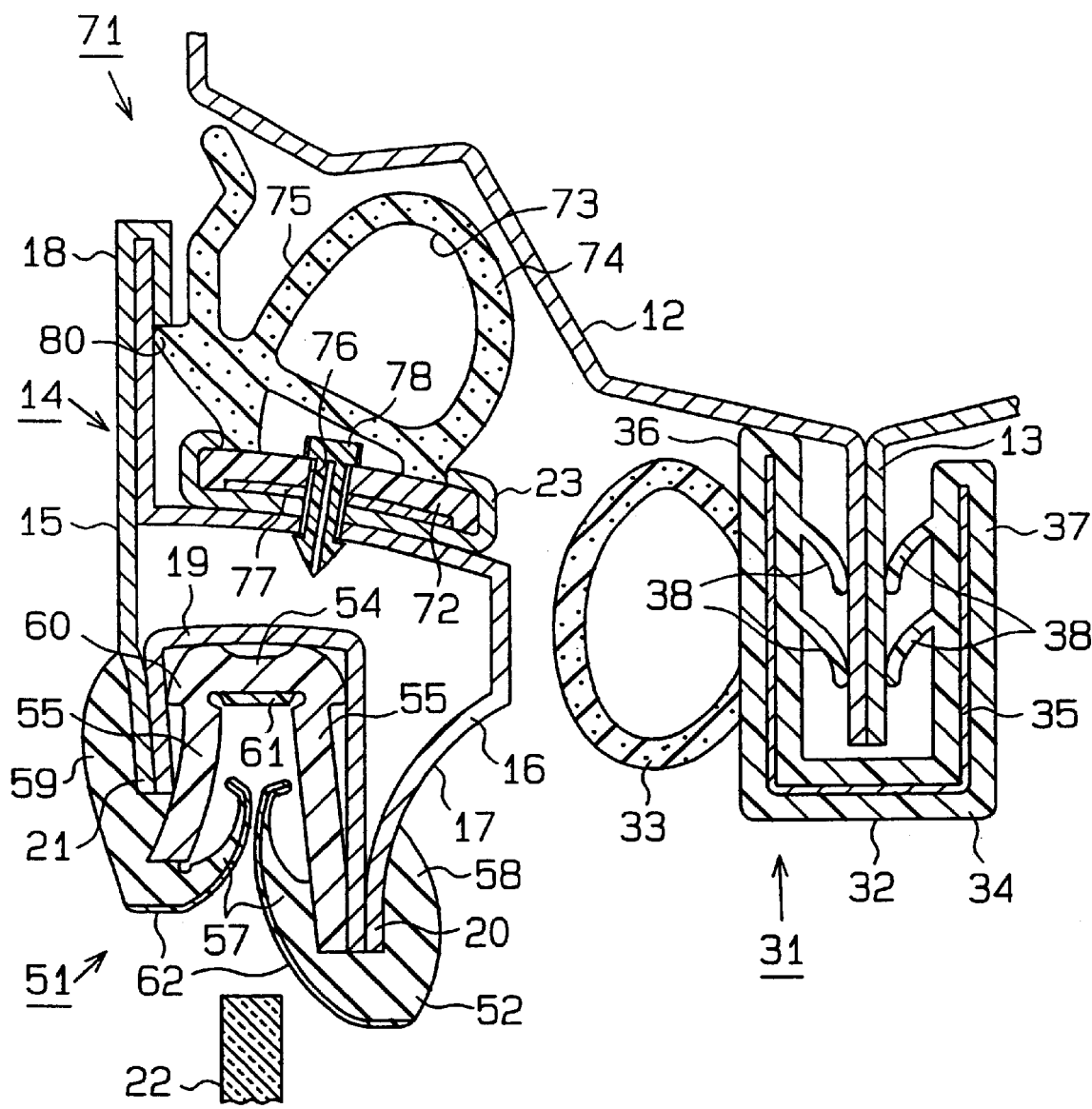
FIG. 1 is a cross-sectional view showing a seal used in a vehicle according to the present invention attached to a vehicle body.
Figure 2:
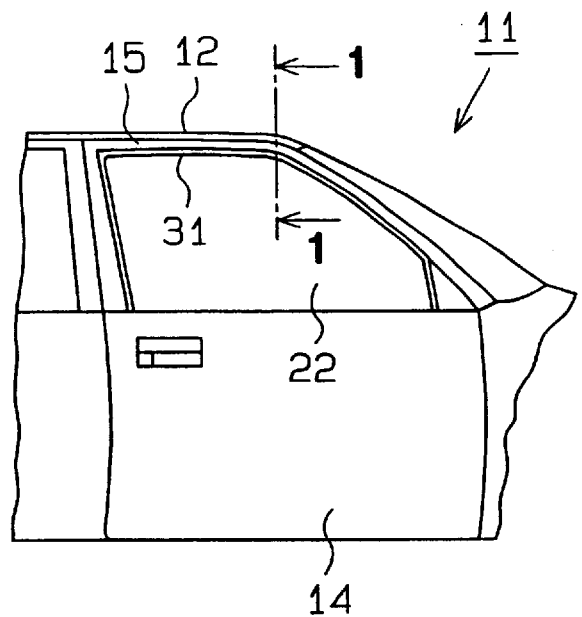
FIG. 2 is a side view showing the body of the vehicle to which the seal is attached.
Figure 3:
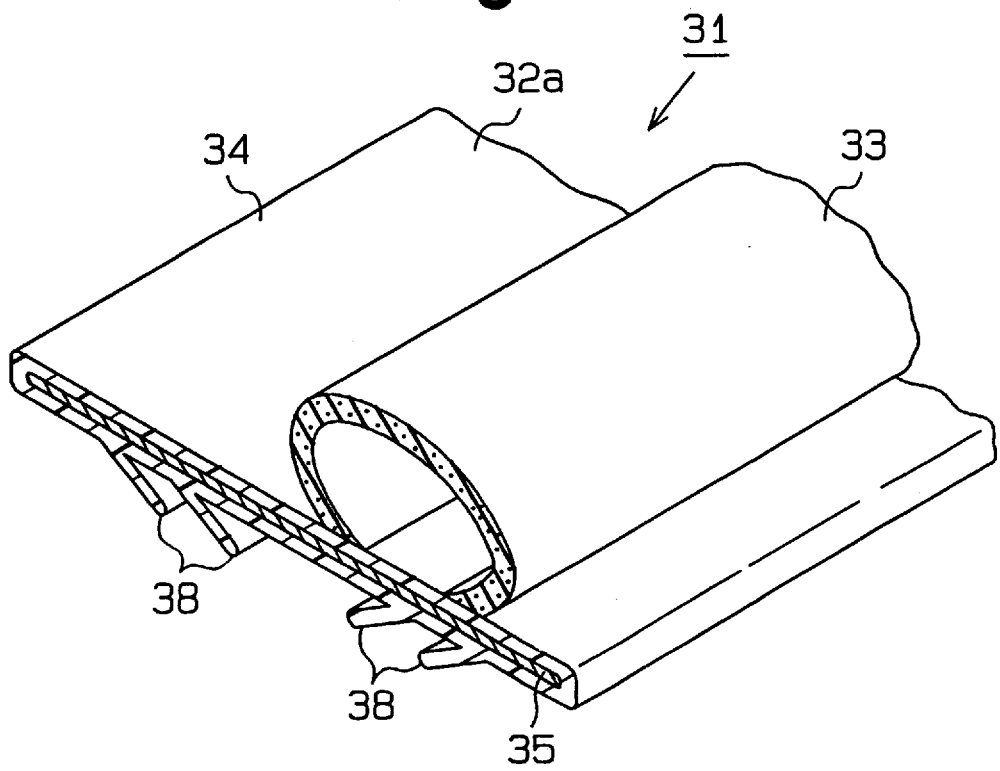
FIG. 3 is a perspective view showing an opening trim weather strip of a first embodiment of the present invention.

As shown in FIGS. 1 and 2, the OT weather strip 31 is attached to a flange 13 extending from a peripheral portion of a door opening which is defined by a roof side panel 12, side panel and pillars of a vehicle 11. FIG. 1 is a cross-sectional view taken along line 1—1 of FIG. 2 and shows a door 14 such as a movable member in a slightly open state.

The OT weather strip 31 has a trim 32 and a hollow seal 33 formed integrally with the trim 32. The trim 32 has a substantially U-shaped cross-section. Most of the OT weather strip 31 is formed by first sections 34 each having sides extending straight. Adjacent first sections 34 are connected to each other by a second section having curved sides. While each first section is formed through extrusion molding, each second section is formed through injection molding. The first sections 34 are arranged at positions corresponding to straight portions of the door opening. The second sections are arranged at positions corresponding to corners of the door opening. The first section 34 has a cross-sectional shape identical to that of the second section.

The OT weather strip 31 is installed at the door opening of the vehicle body by attaching the trim 32 to the flange 13. The trim 32 is formed by embedding a metal core 35 with olefine type thermoplastic elastomer (TPO). This structure maintains the shape of the trim 32, thus ensuring sufficient clamping force of the trim 32.

The composition of TPO includes 50% to 70% of rubber such as ethylene-propylenediene ternary copolymer (EPDM), 25% to 15% of olefine type polymer such as polypropylene (PP), and 25% to 15% of additives such as talc, oil, and lubricant. Since TPO contains rubber in a larger quantity than other components, a portion formed of TPO in a workpiece does not soften or melt when the workpiece is heated in a UHF vulcanizing device 45 (see FIG. 4) and an air heating vulcanizing furnace 46. Thus, the TPO portion of the workpiece maintains its shape as formed by a die 43, which will be later described.

The trim 32 has an outer side wall 36 facing the exterior of the vehicle 11 and an inner side wall 37 facing the passenger compartment of the vehicle 11. Pairs (in this embodiment, two pairs) of lip clamps-38 protrude from each side wall 36, 37. The tips of the lip clamps 38 extending to a bottom wall of the trim 32. The trim 32 thus clamps the flange 13 of the body of the vehicle 11 by the lip clamps 38. This structure prevents the OT weather strip 31 from falling from the vehicle 11.

The hollow seal 33 is formed of vulcanized, ethylene-propylene-diene copolymer (EPDM), sponge rubber. When the door 14 such as a movable member is closed, the hollow seal 33 is deformed and collapsed by an inner panel 16 of a door frame 15. The hollow seal 33 thus seals a space between the door frame 15 and the body panels defining the opening in which the door 14 is received, such as the roof side panel 12.

A facility for manufacturing the OT weather strip 31 will hereafter be described.

Figure 4:
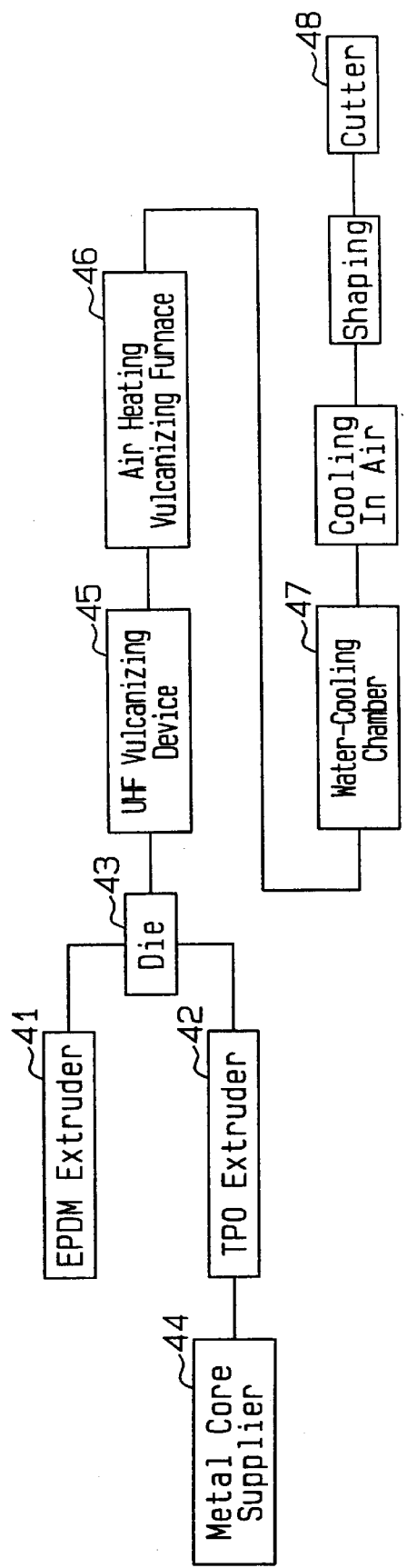
FIG. 4 is a diagram explaining a procedure for forming the opening trim weather strip according to the present invention.

As shown in FIG. 4, the facility for manufacturing the OT weather strip. 31 includes an EPDM extruder 41 and a TPO extruder 42. The extruders 41 and 42 are both connected with a die 43 used for shaping EPDM sponge rubber and TPO as one body through co-extrusion molding. A metal core supplier 44 is arranged upstream from the TPO extruder 42 and supplies a metal core to the extruder 42. The EPDM extruder 41 shapes EPDM sponge rubber for forming the hollow seal 33 and supplies the rubber to the die 43. The TPO extruder 42 shapes TPO for forming the trim 32 having the metal core and supplies the shaped material to the die 43.

A microwave heating vulcanizing device (UHF vulcanizing device) 45, an air heating vulcanizing furnace 46, a water-cooling chamber 47, and a cutter 48 are arranged downstream from the die 43 in this order.

Next, a procedure for manufacturing the OT weather strip 31 will be described.

The EPDM extruder 41 shown in FIG. 4 softens EPDM sponge rubber while maintaining the rubber in unvulcanized state. Meanwhile, the TPO extruder 42 melts TPO and arranges the molten TPO around the metal core supplied by the metal core supplier 44. Subsequently, the EPDM extruder 41 supplies the unvulcanized EPDM sponge rubber to the die 43, while the TPO extruder 42 supplies the die 43 with the shaped material including TPO embedding the metal core. The die 43 shapes EPDM and TPO as one body through co-extrusion molding. In this manner, a workpiece, or a substantially plate-like portion 32a (see FIG. 3) having the hollow seal 33 formed integrally with the plate-like portion 32a, is obtained.

Since the UHF vulcanizing device 45 is separated from the die 43 by a predetermined distance, the workpiece reaches the UHF vulcanizing device 45 after traveling the same distance. Then the workpiece is received microwave radiation of a predetermined energy for a predetermined time period in the UHF vulcanizing device 45. The radiation causes internal heating in the EPDM sponge rubber forming the hollow seal 33 in the workpiece. The internal heating vulcanizes the EPDM sponge rubber. However, no internal heating occurs in TPO. And since TPO has been cooled in the air to a temperature lower than its softening point (about 160° C.) while being sent from the TPO extruder 42 to the die 43. In this manner, the shape of the workpiece is maintained as formed by the die 43.

The energy of the microwave radiated by the UHF vulcanizing device 45 ranges preferably from one to five kilowatts, and, more preferably, from two to four kilowatts. If the energy is a kilowatt or smaller, it takes a relatively long time to raise the EPDM temperature to a point at which vulcanization initiates. The productivity is thus decreased. Furthermore, if the microwave energy is five kilowatts or greater, the EPDM temperature rises rapidly, thus making it difficult to control the vulcanization. Furthermore, the radiation time is determined in relation to the EPDM vulcanizing speed and the work efficiency. The radiation time thus ranges preferably from five to thirty seconds, and, more preferably, from five to fifteen seconds. As the microwave energy becomes larger, the radiation time becomes shorter.

Subsequently, the workpiece is sent to the air heating vulcanizing furnace 46. The ambient temperature in the air heating vulcanizing furnace 46 is controlled such that the temperature of the plate-like portion 32a becomes a value close to the TPO melting point and that the temperature of the hollow seal 33 reaches a point at which EPDM sponge rubber is vulcanized. Specifically, the surface temperature of the workpiece ranges preferably from 160° C. to 185° C., and, more preferably, from 170° C. to 180° C. The ambient temperature in the air heating vulcanizing furnace 46 ranges preferably from 160° C. to 200° C. and, more preferably, from 170° C. to 180° C. Furthermore, the heating time ranges preferably from one to eight minutes, and, more preferably, from two to five minutes. As the workpiece surface temperature and the ambient temperature become higher, the heating time becomes shorter. Furthermore, since TPO has an increased viscosity, TPO does not melt rapidly even if the TPO temperature reaches its melting point, that is, approximately 180° C. In addition, unlike the conventional-type, a layer formed of TPO has a sufficient thickness, thus preserving the shape of the plate-like portion 32a. Particularly, the TPO viscosity is increased by increasing the amount of the rubber contained in TPO as compared with the resin contained in TPO. The increased viscosity makes it easier to preserve the shape of the TPO portion included in the workpiece when the workpiece passes through the air heating vulcanizing furnace 46.

The vulcanized workpiece is then rapidly cooled in the water-cooling chamber 47. Subsequently, the workpiece is sent to a bender (not shown) by which the plate-like portion 32a is bent such that each lip clamp 38 faces the associated lip clamp 38. In this manner, the trim 32 having a U-shaped cross-section is obtained. The workpiece is then cut by the cutter 48 in a plurality of pieces, each having a predetermined length. Each cut piece forms a first section 34 of the OT weather strip 31 and is arranged in a metal mold. The curved, second sections are formed through a known injection molding method in the metal mold such that adjacent first sections 34 are connected with one another by the second sections. In this manner, a complete OT weather strip 31 is obtained.

In the OT weather strip 31 manufactured as described above, the hollow seal 33 is formed of EPDM sponge rubber, while the trim 32 is formed of TPO. The hollow seal 33 and the trim 32 are formed as one body through co-extrusion molding. Since the material of the hollow seal 33 is EPDM sponge rubber as in the conventional type OT weather strip, the hollow seal 33 is sufficiently elastic property even when exposed to cold weather. In other words, the hollow seal 33 does not harden or deform when exposed to a low temperature and maintains its increased seal effect. Furthermore, since the hollow seal 33 does not harden, the door 14 closes smoothly.

Since most of the trim 32 in the OT weather strip 31 is formed of TPO, the trim 32 is lighter than a trim formed of EPDM solid rubber. The OT weather strip 31 thus becomes relatively light as a whole.

Furthermore, the trim 32 has an increased rigidity, thus increasing the clamping force ofthe lip clamps 38. This structure prevents the OT weather strip 31 from falling from the vehicle body. In addition, since the appearance of the OT weather strip 31 is improved simply by coloring the TPO portion of the trim 32, no separate decorating layer need be provided. If the trim 32 is formed of EPDM solid rubber like the conventional-type OT weather strip, carbon black must be applied on the trim 32 for improving the strength of the trim 32. This does not improve the appearance of the OT weather strip 31.

In the above procedure, the OT weather strip 31 is obtained by forming the trim 32 and the hollow seal 33 as one body through co-extrusion molding. Thus, no dies having complicated structures are required, while no roller press-fitting steps need be performed. Furthermore, the die 43 shapes TPO embedding the metal core 35 and EPDM sponge rubber as one body such that a predetermined shape of workpiece is obtained. Thus, the configuration of the die 43 is greatly simplified. The manufacture cost is thus reduced.

As described above, the workpiece is sent from the die 43 to the UHF vulcanizing device 45 and the workpiece is exposed to the microwave radiation in the UHF vulcanizing device 45. The radiation causes internal heating in EPDM, which initiates the vulcanization of the EPDM sponge rubber included in the workpiece. Subsequently, the EPDM vulcanization is completed in the air heating vulcanizing furnace 46 at a temperature at which the EPDM sponge rubber is vulcanized but TPO does not melt. The vulcanization of the EPDM forming the hollow seal 33 is thus reliably performed in the air heating vulcanizing furnace 46 without deforming the shape of the trim 32.

The workpiece is sent from the air heating vulcanizing furnace 46 to the water-cooling chamber 47 in which the workpiece is rapidly cooled. The cooling quickly lowers the temperature of the TPO portion of the workpiece to 50° C. The lowered temperature of the TPO portion prevents the surface of the trim 32 from being damaged through contact with a conveyer belt extending along the manufacture facility for transporting the workpiece in the vulcanizing device.

A second embodiment of the present invention, or a door glass run channel (weather strip) 51, will now be described with reference to FIGS. 1, 5, 6, and 10(a).

As shown in FIG. 1, the door 14 is provided with a window frame 17 including an inner panel 16 and an outer panel 18 of the door frame 15. The inner panel 16 is arranged closer to the passenger compartment of the vehicle 11 than the outer panel 18. The window frame 17 also has a channel 19 arranged between the inner panel 16 and the outer panel 18. A flange 20 is defined by an end of the inner panel 16 and the adjacent end of the channel 19, while a flange 21 is defined by an end of the outer panel 18 and the adjacent end of the channel 19. A door glass run channel 51 is supported by the flanges 20, 21. The window frame 17 has an upper section, a front section, and a rear section, as defined in a proceeding direction of the vehicle 11. The door glass run channel 51 extends along the inner sides of the upper, front, and rear sections of the window frame 17. The lower section of the window frame 17 is not lined with the door glass run channel 51.

Most of the door glass run channel 51 is formed through co-extrusion molding, as will be described later. The door glass run channel 51 includes a plurality of first sections 52 each having a predetermined length. The door glass run channel 51 also includes a plurality of second sections formed through a known injection molding method. Each second section is arranged between adjacent first sections 52. The second section has a cross-sectional shape identical to the cross-sectional shape of each first section 52 shown in FIG. 1.

Figure 5:
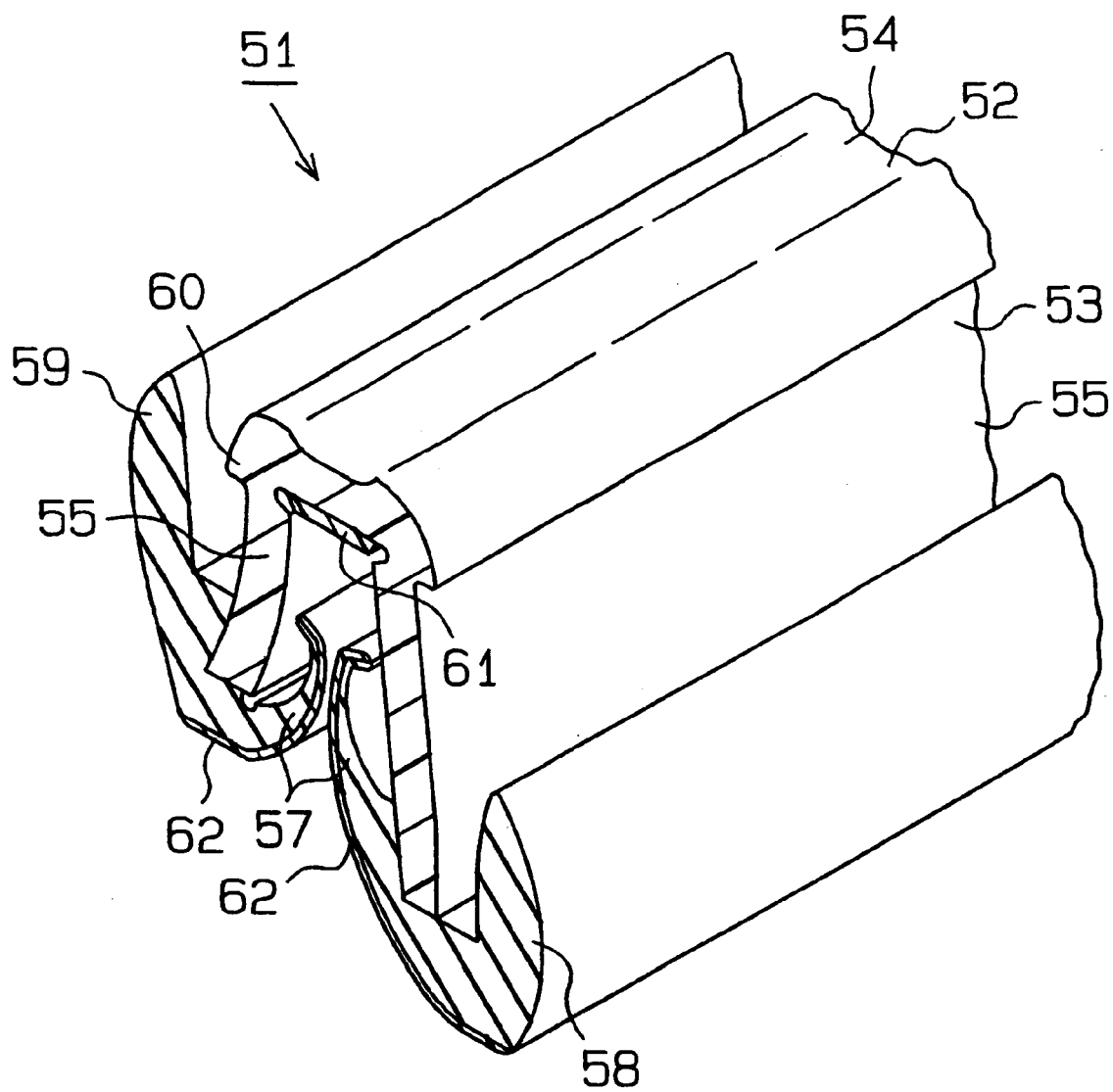
FIG. 5 is a perspective view showing a door glass run channel of a second embodiment according to the present invention.

As shown in FIGS. 1 and 5, the door glass run channel 51 includes a main body 53 having a channel-like cross section and serving as a support. The main body 53 has a pair of side walls 55 and a connecting bottom wall 54. The side walls 55 are connected with each other by the connecting bottom wall 54. The free ends of the side walls 55 define an opening that faces downward.

A pair of support lips 58, 59 are arranged outside of the associated side walls 55. The support lip 58 abuts against an outer side of the inner panel 16 facing the passenger compartment of the vehicle 11. The support lip 58 cooperates with the associated side wall 55 of the main body 53 to clamp the flange 20. The support lip 59 comes in contact with an outer side of the outer panel 18 facing the exterior of the vehicle 11. The support lip 59 cooperates with an projection 60 extending from the connecting bottom wall 54 to clamp the flange 21.

A pair of opposed lip seals 57 extend upward in a curved manner from the lower ends of the support lips 58, 59 and enter the opening defined by the side walls 55 of the main body 53. The lip seals 57 come in contact with the associated sides of a door glass 22 and guide the door glass 22 to slide along the door glass run channel 51. When the door window is completely closed by the door glass 22, the door glass run channel 51 prevents rain, washing water, mud, noise and the like from entering the passenger compartment.

The main body 53 is formed of TPO containing rubber in a larger quantity than resin. A slide contacting portion 61 projects from the inner side of the connecting bottom wall 54. The slide contacting portion 61 is formed of TPO containing an agent improving sliding property (hereafter referred to as "TPOslide") of the slide contacting portion 61, such as a silicone type agent and an amide type agent. The slide contacting portion 61 forms a solid sliding surface along which the door glass 22 slides. When the door window is completely closed, the door glass 22 stops by abutting against the slide contacting portion 61 of the upper section of the door glass run channel 51 attached to the upper section of the window frame 17.

Each lip seal 57 is formed of EPDM solid rubber. The outer surface of the lip seal 57 is coated with TPO coating. The TPO coating forms a sliding layer 62. The sliding layer 62 allows the door glass 22 to move upward and downward smoothly while sliding along the lip seal 57.

A facility for manufacturing the door glass run channel 51 will hereafter be described.

Figure 6:
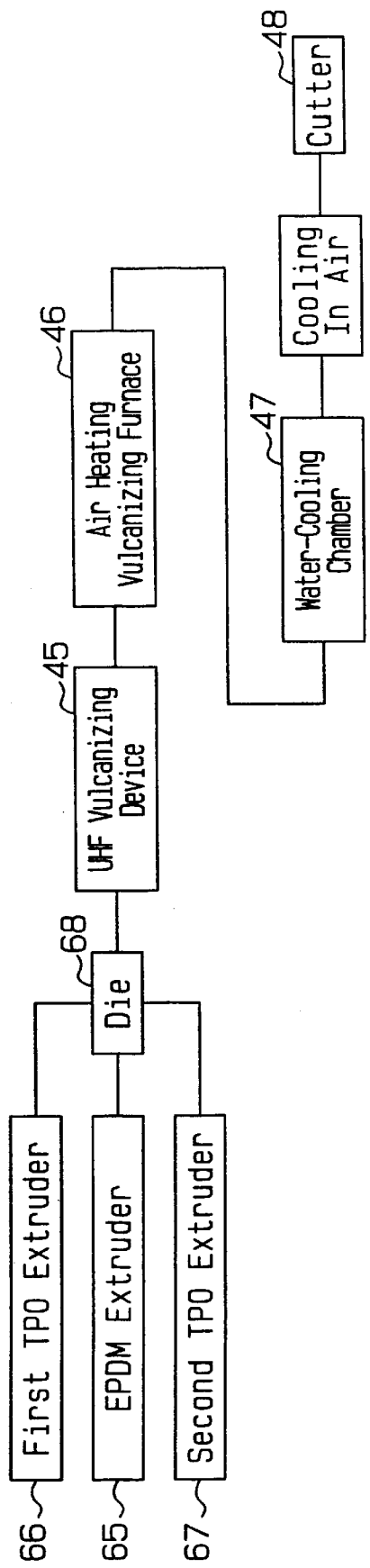
FIG. 6 is diagram explaining a procedure for forming the door glass run channel according to the present invention.

As shown in FIG. 6, the facility includes an EPDM extruder 65, a first TPO extruder 66, and a second TPO extruder 67. The extruders 65 to 67 are connected with a die 68 used for co-extrusion molding. The EPDM extruder 65 extrudes EPDM solid rubber for forming the lip seals 57 and the support lips 58, 59. The first TPO extruder 66 extrudes TPO for forming the main body 53. The second TPO extruder 67 extrudes TPO coating for forming the slide contacting portion 61 and the sliding layer 62. A UHF vulcanizing device 45, an air heating vulcanizing furnace 46, water-cooling chamber 47, and a cutter 48 are arranged downstream from the die 68 in this order.

A procedure for manufacturing the door glass run channel 51 will now be described.

The EPDM extruder 65, the first TPO extruder 66, and the second TPO extruder 67 supply EPDM solid rubber, TPO, and TPO coating, respectively, to the die 68. The materials are then shaped by the die 68 such that a workpiece having the structure of the door glass run channel 51 of FIG. 5 is obtained. The workpiece is then subjected to the substantially same manufacture procedure as the OT weather strip 31, except that no bending step is performed for the door glass run channel 51. In this manner, the first sections 52 of the door glass run channel 51 are obtained.

The temperatures of the lips 57 to 59 (formed of EPDM) and the main body 53 (formed of TPO) included in the workpiece were measured during the manufacture process. The results are as follows.

Figure 10A:
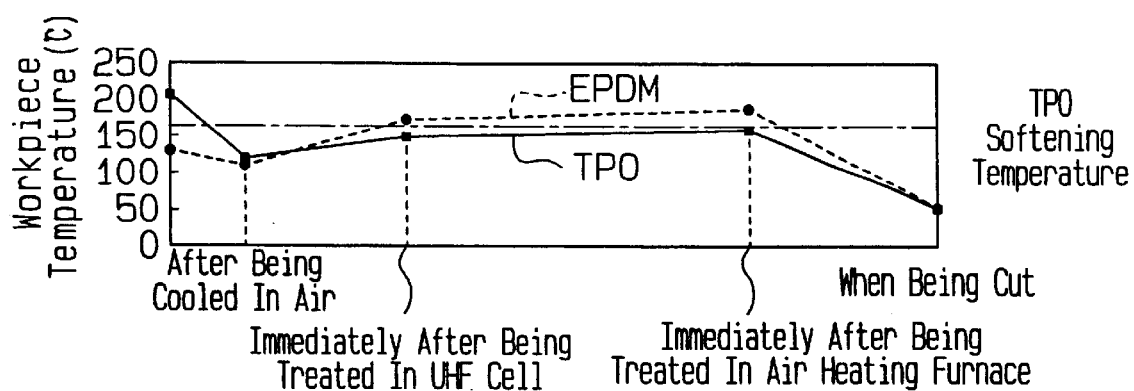
FIG. 10(*a*) is a graph showing the temperature variations of EPDM and TPO in a workpiece of the door glass run channel during the procedure shown in FIG. 6.

As shown in FIG. 10(a), immediately after the workpiece is formed by the die 68, the temperature of a portion formed of EPDM included in the workpiece was 130° C. and the temperature of a portion formed of TPO included in the same workpiece was 200° C. The temperatures of both portions were lowered to about 110° C. to 120° C. by cooling the workpiece in the air while sending the workpiece from the die 68 to the UHF vulcanizing device 45. Subsequently, the workpiece was supplied to the UHF vulcanizing device 45 (in which the target temperature was 100° C. and the ambient temperature was 70° C. to 80° C.). While the workpiece is being passed through the UHF vulcanizing device 45, internal heating occurred in the EPDM portion of the workpiece such that the temperature of this portion rose to about 170° C. The heat promoted the EPDM vulcanization. Meanwhile, no internal heating was caused in the TPO portion of the workpiece. The temperature of the TPO portion thus increased only to about 150° C. due to heat transmitted from the EPDM.

Subsequently, the workpiece was further heated in the air heating vulcanizing furnace 46 (in which the target temperature was 200° C. and the ambient temperature was 175° C. to 180° C.). When the workpiece was located close to the exit of the heating vulcanizing furnace 46, the temperature of the portion formed of EPDM in the workpiece was about 180° C. and the temperature of the portion formed of TPO in the workpiece was about 160° C. The workpiece was then sent to the water-cooling chamber 47 and rapidly cooled to about 50° C. As described above, when EPDM was heated and vulcanized, the temperature of TPO included in the workpiece did not greatly exceed the TPO softening point. The portion formed of TPO in the workpiece thus maintained its shape.

The lip seals 57 of the door glass run channel 51 are formed of EPDM solid rubber. Thus, even when the door glass run channel 51 is exposed to cold weather at the low temperature, the lip seals 57 have the elastic property and they are resiliently deformed when abutted by the door glass 22. This structure allows the door glass run channel 51 to seal the passenger compartment of the vehicle 11 effectively even in the low temperature weather. Furthermore, since EPDM solid rubber prevents the lip seals 57 from hardening in the low tepmerature, the door glass 22 is always allowed to move smoothly.

The main body 53 of the door glass run channel 51 is formed of TPO. The main body 53 is thus relatively light as compared with a body formed of EPDM. The lighter main body 53 reduces the weight of the door glass run channel 51 as a whole. The door glass run channel 51 is thus easily attached to the window frame 17.

The sliding layers 62 of TPO coating is formed integrally with the associated lip seals 57 through co-extrusion molding. Thus, unlike the conventional-type glass run channel, it is not necessary to apply polyurethane layer on the surfaces of the vulcanized lip seals 57 and harden the polyurethane for allowing the door glass 22 to smoothly slide along the lip seals 57. The number of the procedure steps for manufacturing the door glass run channel 51 is thus decreased. The cost for the manufacture facility of the door glass run channel 51 is also reduced.

A third embodiment of the present invention, or a door weather strip 71, will now be described with reference to FIGS. 1 and 7.

As shown in FIG. 1, the door weather strip 71 is attached to a peripheral portion of the inner panel 61 of the door frame 15 by a retainer 23.

Figure 7:
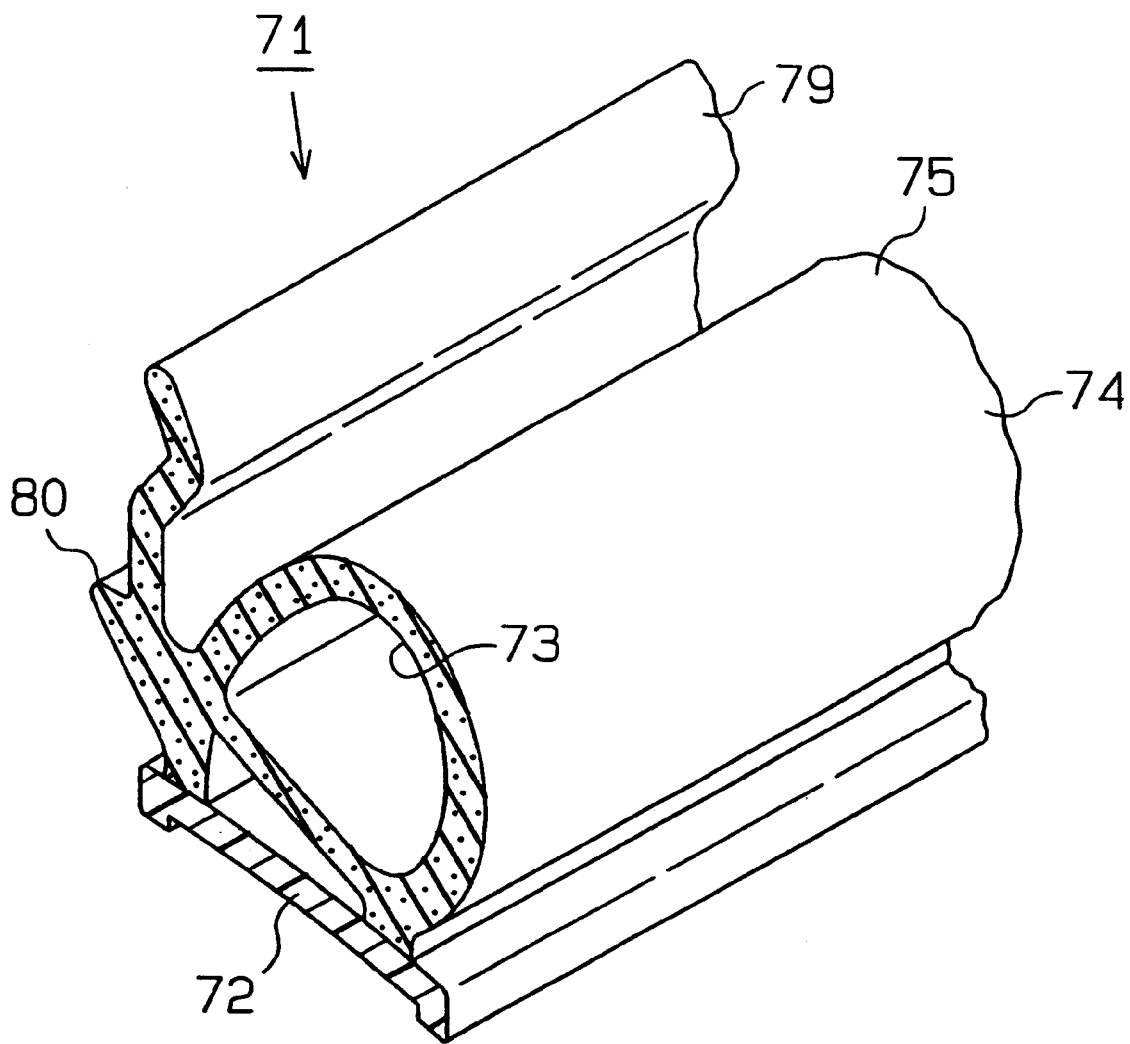
FIG. 7 is a perspective view showing a door weather strip of a third embodiment according to the present invention.

As shown in FIGS. 1 and 7, the door weather strip 71 includes a base 72 and a hollow seal 74 extending from the base 72. The base 72 is retained in the retainer 23. A hollow portion 73 is defined in the hollow seal 74. The door weather strip 71 is substantially annular and extends along the contour of the door 14 and the door frame 15. Most of the door weather strip 71 is formed through extrusion molding like the first embodiment (although no metal core is supplied). The door weather strip 71 includes a plurality of first sections 75 each having a predetermined length. The first sections 75 are connected with one another by elbow-like, second sections formed through a known injection molding method. The cross-sectional shape of each second section is identical to that of the first section.

The base 72 is formed of TPO and retained in the retainer 23 such that the base 72 is secured to the door frame 15. Although the retainer 23 is used in this embodiment, an adhesive member such as a double side coated tape 77 may use the bottom of the base 72, as shown in FIG. 1, to bond the base 72 to the door frame 15. Alternatively, a through hole 76 may form through the base 72 such that a fastener such as a clip 78 is inserted through the hole 76 and secures the base 72 to the door frame 15, also as shown in. FIG. 1.

The hollow seal 74 is formed of EPDM sponge rubber. As shown in FIG. 7, a lip seal 79 and a back lip 80 are formed integrally with the hollow seal 74. The back lip 80 comes in contact with an end of the outer panel 18 and the inner panel 16 in the vicinity of the bent portion of the outer panel 18, as shown in FIG. 1. The back lip 80 thus seals between an inner surface of the end of the outer panel 18 and the inner panel 16 and an outer surface of the lip seal 79. If the clip 78 is used for securing the base 72 to the door frame 15, the clip 78 is installed at the portion of the base 72 corresponding to the through hole 76 by a slit 81 extending between the base 72 and the hollow seal 74 at the inner side.

When the door 14 is closed, the hollow seal 74 and the lip seal 79 come in contact with the vehicle's body panels defining an opening for accommodating the door 14 such as the roof side panel 12. In this state, the hollow seal 74 is collapsed and deformed, while the lip seal 79 is resiliently deformed. The door weather strip 71 thus seals space defined between the door 14 and the body panels.

In this door weather strip 71, the hollow seal 74 and the lip seal 79 are formed of EPDM sponge rubber. Therefore, the hollow seal 74 and the lip seal 79 do not harden when the door weather strip 71 is exposed to a low temperature. The hollow seal 74 and the lip seal 79 are thus still deformable. The door weather strip 71 thus reliably seals space between the door 14 and the door frames 15 and the body panels defining the opening for accommodating the door 14 including the roof side panel 12. Furthermore, since the hollow seal 74 and the lip seal 79 both remain the elastic property, the door 14 is closed easily.

The base 72 of the door weather strip 71 is formed of TPO. The rigidity of the base 72 is thus improved as compared with a base formed of EPDM sponge rubber. Therefore, the base 72 does not fall from the retainer 23. Furthermore, even if the clip 78 is inserted through the through hole 76, the strength of the base 72 in the vicinity of the through hole 76 is sufficient. This structure prevents the base 72 from cracking in the vicinity of the hole 76. The door weather strip 71 is thus reliably secured to the door frame 15.

A fourth embodiment of the present invention, or a procedure for manufacturing the door glass run channel 51, will be now described. The difference from the second embodiment will be mainly discussed with reference to FIGS. 8 to 10.

Figure 8:
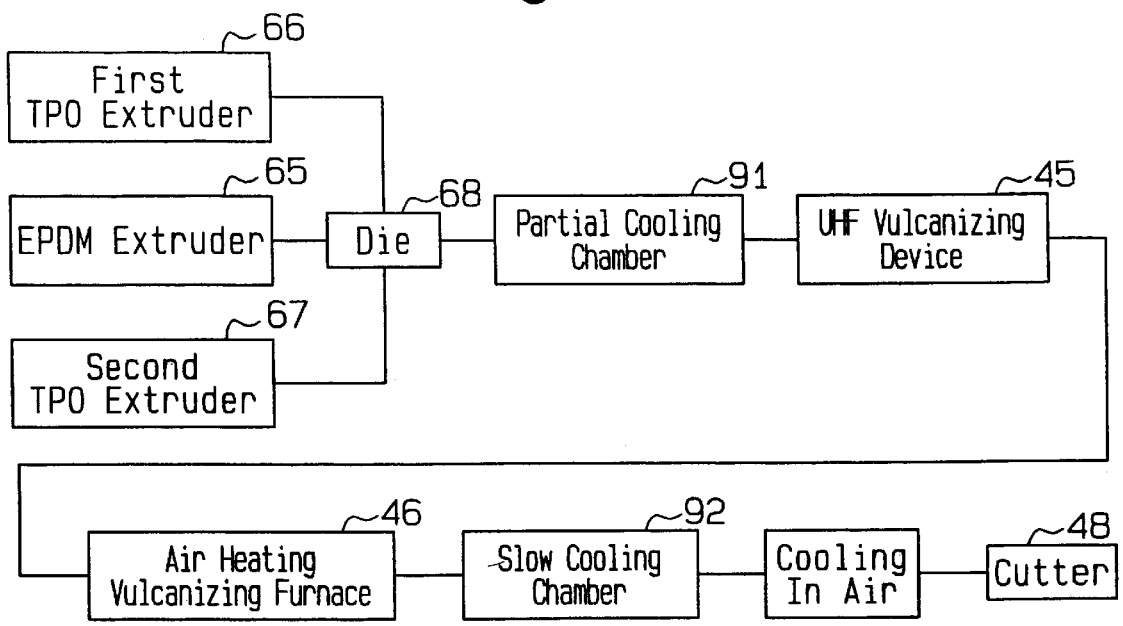
FIG. 8 is a diagram explaining a procedure for forming a door glass run channel of a fourth embodiment according to the present invention.

As shown in FIG. 8, a facility for manufacturing the door glass run channel 51 includes a partial cooling chamber 91 and a slow cooling chamber 92. The partial cooling chamber 91 is arranged downstream from the die 68 and separated from the die 68 by a predetermined distance. The slow cooling chamber 92 is arranged downstream from the air heating vulcanizing furnace 46.

Figure 9:
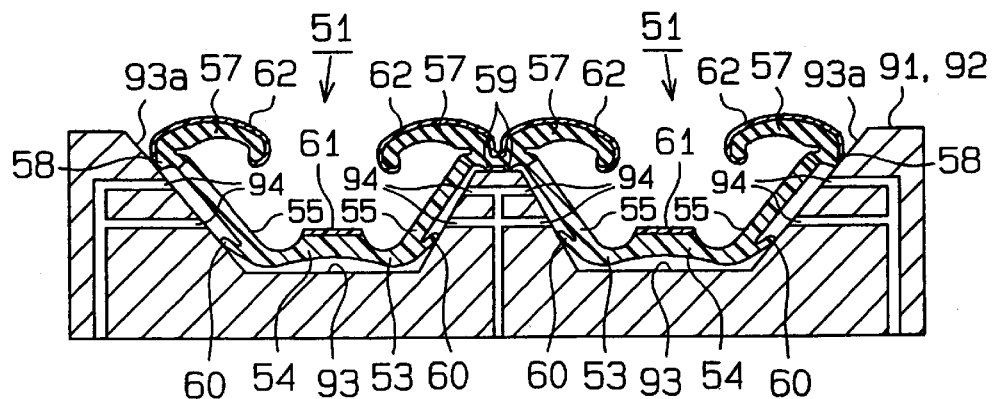
FIG. 9 is a cross-sectional view showing a partial water-cooling chamber and a slow cooling chamber shown in FIG. 8.

As shown in FIG. 9, recesses 93 are defined in the top surface of the partial cooling chamber 91. Each recess 93 has a trapezoidal cross-sectional shape having an upper side wider than its lower side. The shape of the recess 93 thus corresponds to the shape of the main body 53 (formed of TPO) included in the workpiece of the door glass run channel 51, which is shaped by the die 68. As shown in FIG. 9, the partial cooling chamber 91 is adapted to the die 68 forming two first sections 52 of the door glass run channel 51 at one time through extrusion molding. Furthermore, the door glass run channel 51 of FIG. 9 has smaller support lips 58, 59 than the door glass run channel 51 shown in FIG. 5.

Each recess 93 has side walls 93a through which a plurality of coolant injecting ports 94 extend. The coolant injecting ports 94 are aligned in two lines, each line extending in the moving direction of the workpiece (in a direction perpendicular to the paper surface of FIG. 9). The coolant injecting ports 94 are separated from adjacent injecting ports 94 by predetermined intervals. The partial cooling chamber 91 injects coolant liquid such as water directly to the portion formed of TPO in the workpiece through each injecting port 94. The temperature of the coolant liquid is, for example, 15° C. to 20° C. The support lips 58, 59 contacting the side walls 93a of each recess 93 are cooled indirectly by the coolant liquid. In this manner, the TPO portion included in the workpiece that has been cooled while being sent to the partial cooling chamber 91 from the die 68 is further cooled while passing through the chamber 91.

The slow cooling chamber 92 has a substantially identical structure to that of the partial cooling chamber 91. Specifically, the slow cooling chamber 92 also has the injection ports 94 through which heated water or air is injected to the portion formed of TPO in the workpiece. The temperature of the heated water or air is, for example, 50° C. to 100° C. In this manner, while passing through the slow cooling chamber 92, the TPO formed portion in the workpiece having the vulcanized EPDM formed portion is slowly cooled.

The door glass run channel 51 was manufactured using the facility of the fourth embodiment. The temperature of the UHF vulcanizing device 45 and the temperature of the air heating vulcanizing furnace 46 were the same values selected in the second embodiment. During the manufacture of the door glass run channel 51, the temperature of the lips 57 to 59 (formed of EPDM) and the temperature of the main body 53 (formed of TPO) were measured. The following are the results of the measurement.

Figure 10B:
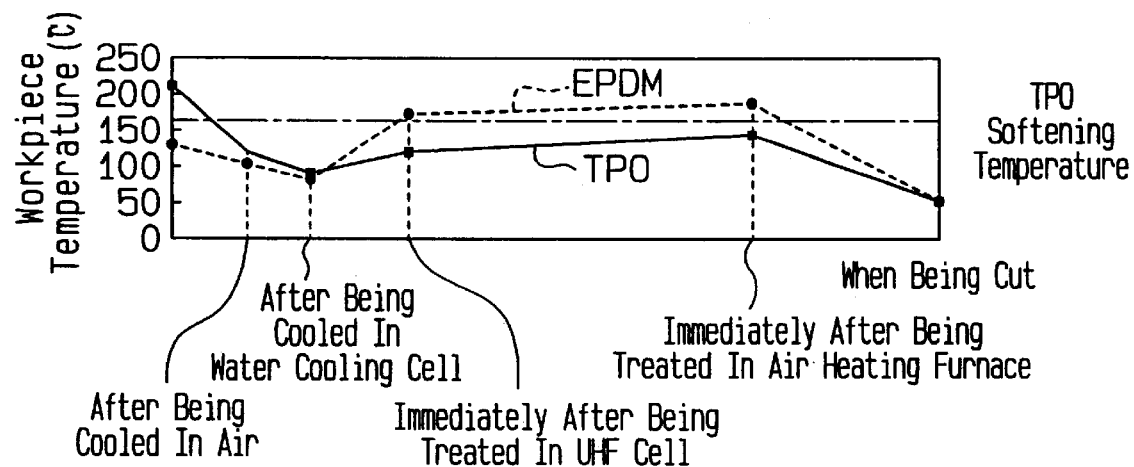
Figure 11:
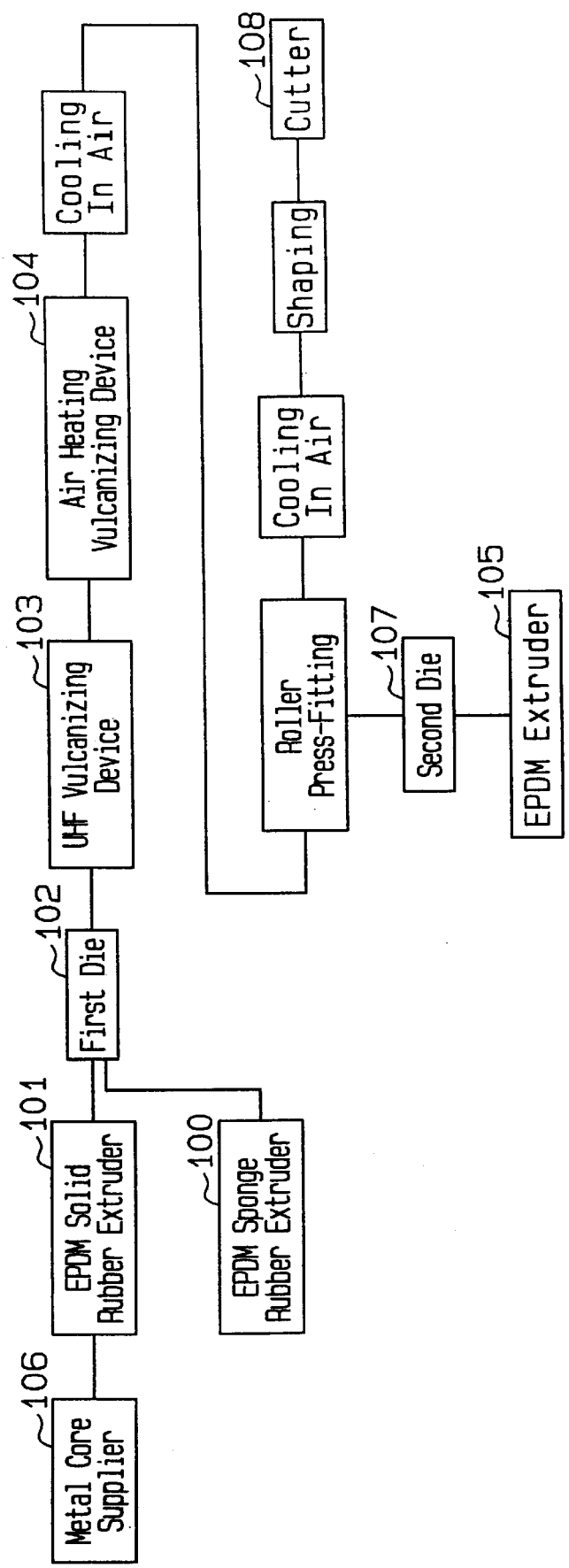
FIG. 11 is a diagram explaining a conventional-type procedure for forming an opening trim weather strip.

As shown in FIG. 10(b), immediately after the workpiece was formed by the die 68, the temperature of a portion formed of EPDM included in the workpiece was 130° C. and the temperature of a portion formed of TPO included in the same workpiece was 200° C. The temperatures of both portions were lowered to about 110° C. to 120° C. by cooling the workpiece in the air while sending the workpiece from the die 68 to the partial cooling chamber 91. The temperatures of the EPDM portion and the TPO portion included in the workpiece were further lowered to 90° C. to 100° C. by cooling the workpiece in the partial cooling chamber 91.

Subsequently, the workpiece was sent to the UHF vulcanizing device 45 in which internal heating occurred in the EPDM portion included in the workpiece. The temperature of this portion thus rose to about 170° C. such that the vulcanization of EPDM was promoted.

Meanwhile, no internal heating occurred in the TPO portion of the workpiece. The temperature of this portion thus rose only to 120° C. The workpiece was then sent to the air heating vulcanizing furnace 46 and further heated while passing through the air heating vulcanizing furnace 46. The temperature of the EPDM portion included in the workpiece located near the exit of the air heating vulcanizing furnace 46 was 180° C. However, the temperature of the TPO portion included in the same workpiece was only 130° C. Next, the workpiece was cooled to about 50° C. after the workpiece was cooled slowly in the slow cooling chamber 92 and then cooled in the air. As described above, the maximum temperature of the TPO portion in the workpiece was about 130° C. and lower than the TPO softening point.

In the fourth embodiment, the partial cooling chamber 91 is provided upstream from the UHF vulcanizing device 45 for cooling only the portion formed of TPO in the workpiece. The TPO portion included in the workpiece is thus positively cooled in the partial cooling chamber 91 before the workpiece is sent to the UHF vulcanizing device 45 and then to the air heating vulcanizing furnace 46. Therefore, the workpiece solidifies while maintaining its shape as formed by the die 68. Afterward, the workpiece is heated in the UHF vulcanizing device 45 and the air heating vulcanizing furnace 46. However, the temperature of the TPO portion included in the workpiece does not rise greatly and remains lower than the TPO softening point. In this manner, the TPO portion included in the workpiece maintains its shape, thus reliably maintaining the shape of the main body 53.

After being heated by the air heating vulcanizing furnace 46, the TPO portion included in the workpiece is slowly cooled in the slow cooling chamber 92. This cooling step reduces thermal distortion caused in the workpiece due to heat produced by the UHF vulcanizing device 45 and the air heating vulcanizing furnace 46. This suppresses deformation of the main body 53 in the door glass run channel 51.

In the fourth embodiment, the temperature of the water or air injected directly to the workpiece through the injection ports in the partial cooling chamber 91 and the slow cooling chamber 92 may be varied gradually or in a step-like manner along the moving direction of the workpiece.

Furthermore, at least either the UHF vulcanizing device 45 or the air heating vulcanizing France 46 may be provided with a recess having the same structure as those in the partial cooling chamber 91. When the workpiece moves in the recess in the UHF vulcanizing device 45 or the air heating vulcanizing furnace 46, air having a predetermined temperature is injected to the workpiece such that the TPO portion of the workpiece is cooled.

In this structure, the maximum temperature of the TPO portion in the workpiece is further lowered, thus maintaining the shape of the TPO portion more reliably.

Furthermore, the above embodiments of the present invention may be modified as follows.

In the illustrated embodiments, adhesive resin may be provided between EPDM rubber and TPO when the materials are formed as one body through co-extrusion molding. The resin firmly adheres the EPDM portion with the TPO portion in the workpiece, thus preventing these portions from separating from each other. This structure prolongs life of the resulting weather strip.

The OT weather strip 31 of the first embodiment and the door weather strip 71 of the third embodiment may be manufactured using the facility of the fourth embodiment.

In the above embodiments, EPDM is used as rubber. However, the rubber may be, for example, styrene-butadiene rubber (SBR), butadiene rubber (BR), isoprene rubber (IR), ethylene-propylene copolymer (EPC), nitrile-butadiene rubber (NBR), chloroprene rubber, butyl rubber (IIR), and urethane rubber (U).

In the above embodiments, olefine type thermoplastic elastomer (TPO) is used as thermoplastic elastomer. However, TPO may be replaced by, for example, styrene type (SBC), urethane type (TPU), polyester type (TPEE), polyamide type (TPAE), 1, 2-polybutadiene type, and vinyl chloride type (TPVC) of thermoplastic resin.

Therefore, the present examples and embodiments are to be considered as illustrative and not restrictive and the invention is not to be limited to the details given herein, but may be modified within the scope of the appended claims.

What is claimed is:

1. A seal for a vehicle, said vehicle including an opening and a movable member movably disposed in said opening to selectively close and open said opening, said seal comprising:

a first portion made of a vulcanizable ethylene-propylene-diene copolymer (EPDM) rubber; and a second portion made of an olefinic thermoplastic elastomer (TPE), wherein said first portion and at least a part of said second portion being integrated by coextrusion, wherein said rubber of said first portion is vulcanized as the seal passes through a vulcanizer, wherein said seal is mounted to one of said movable member and an inner edge surrounding said opening, wherein said first portion of said seal is elastically deformed when pressed against one of said movable member and said inner edge, wherein said movable member includes a door having a door frame, wherein said opening is a door opening, wherein said seal is a door opening weather strip, wherein said first portion of said door opening weather strip pressively contacts said door frame and is made of EPDM sponge rubber, wherein said second portion of said door opening weather strip has a support portion for supporting said first portion and is mounted on said inner edge surrounding said door opening, and wherein said support portion is made of a solid olefinic thermoplastic elastomer.

2. The seal for a vehicle as set forth in claims 1, wherein said support portion has a U-shaped portion with a bottom wall, a pair of walls opposite each other, and a plurality of lips projecting from said pair of walls toward said bottom wall, and wherein said U-shaped portion has a metal core embedded therein to maintain its shape and to enhance clamping force of said plurality of lips for clamping a flange of said inner edge surrounding said door opening.

3. A seal for a vehicle, said vehicle including an opening and a movable member movably disposed in said opening to selectively close and open said opening, said seal comprising:

a first portion made of a vulcanizable ethylene-propylene-diene copolymer (EPDM) rubber; and a second portion made of an olefinic thermoplastic elastomer (TPE), wherein said first portion and at least a part of said second portion being integrated by coextrusion, wherein said rubber of said first portion is vulcanized as the seal passes through a vulcanizer, wherein said seal is mounted to one of said movable member and an inner edge surrounding said opening, wherein said first portion of said seal is elastically deformed when pressed against one of said movable member and said inner edge, wherein said vehicle has a door with a door frame surrounding said opening, wherein said opening is a door window opening, wherein said seal is a glass run channel, wherein said movable member includes a glass movably located within said door frame to selectively open and close said door window opening, wherein said first portion of said glass run channel includes a seal lip for pressively contacting said glass and is made of solid EPDM rubber, wherein said second portion of said glass run channel is mounted to said door frame and includes a support portion for supporting said seal lip, and wherein said support portion is made of a solid olefinic thermoplastic elastomer.

4. The seal for a vehicle as set forth in claim 3, wherein said seal lip includes a contact portion that slidably contacts said glass, wherein said contact portion of said seal lip is made of said thermoplastic elastomer with an agent for improving sliding performance, and wherein said contact portion is integrated with rubber forming said seal lip by coextrusion.

5. A seal for a vehicle, said vehicle including an opening and a movable member movably disposed in said opening to selectively close and open said opening, said seal comprising:

a first portion made of a vulcanizable ethylene-propylene-diene copolymer (EPDM) rubber; and a second portion made of an olefinic thermoplastic elastomer (TPE), wherein said first portion and at least a part of said second portion being integrated by coextrusion, wherein said rubber of said first portion is vulcanized as the seal passes through a vulcanizer, wherein said seal is mounted to one of said movable member and an inner edge surrounding said opening, wherein said first portion of said seal is elastically deformed when pressed against one of said movable member and said inner edge, wherein said movable member includes a door having a door frame, wherein said opening is a door opening, wherein said seal is a door weather strip, wherein said first portion of said door weather strip pressively contacts a peripheral portion of said door opening and is made of EPDM sponge rubber, and wherein said second portion of said door weather strip has a support portion for supporting said first portion of said door weather strip on an outer peripheral portion of said door, said support portion being made of a solid olefinic thermoplastic elastomer.

6. The seal for a vehicle as set forth in claim 5, wherein a retainer secures said outer peripheral portion of said door, and wherein said support portion is attached to said retainer.

7. The seal for a vehicle as set forth in claim 5, wherein said support portion is fastened on said outer peripheral portion of said door by a plurality of fasteners.

8. The seal for a vehicle as set forth in claim 5, wherein said support portion is bound to said outer peripheral portion of said door by double side coated adhesive tape.

9. A seal for a vehicle, said vehicle including an opening and a movable member movably disposed in said opening to selectively close and open said opening, wherein said movable member has an outer edge and said opening is surrounded by an inner edge, said seal comprising:

a seal portion made of a vulcanizable ethylene-propylene-diene copolymer (EPDM) rubber to obtain elasticity required for elastic deformation in a plurality of temperatures; and a base portion mounted to one of said movable member and said inner edge, said base portion being made of an olefinic thermoplastic elastomer to obtain rigidity and compatibility with the rubber, wherein said seal portion and at least a part of said base portion being integrated by coextrusion, wherein said vulcanizable rubber of said seal portion is vulcanized as the seal passes through a vulcanizer, and wherein said seal portion is subject to elastic deformation when being pressed against said outer edge of movable member or said inner edge surrounding said opening.

10. The seal for a vehicle as set forth in claim 9, wherein said movable member includes a door having a door frame, wherein said seal is a door opening weather strip, wherein said opening is a door opening of a body, wherein said seal portion of said door opening weather strip pressively contacts a peripheral portion of said door and is made of EPDM sponge rubber, wherein said base portion of said door opening weather strip has a support portion for supporting said seal portion on said inner edge surrounding said door opening, and wherein said support portion is made of a solid olefinic thermoplastic elastomer.

11. The seal for a vehicle as set forth in claim 10, wherein said support has a U-shaped portion with a bottom wall, a pair of side walls opposite each other, and a plurality of lips projecting from said pair of side walls toward said bottom wall to clamp said inner edge of said body, and wherein said U-shaped portion has a metal core embedded therein to maintain its shape and to enhance clamping force of said plurality of lips for clamping a flange of said inner edge surrounding said door opening.

12. The seal for a vehicle as set forth in claim 9, wherein said vehicle has a door with a door frame, wherein said opening is a door window opening, wherein said seal is a glass run channel, wherein said movable member includes a glass movably located within said door frame to selectively open and close said door window opening, wherein said seal portion of said glass run channel includes a seal lip that pressively contacts said glass and is made of solid EPDM rubber, wherein said base portion of said glass run channel is provided with said door frame and includes a support portion for supporting said seal lip, and wherein said support is made of a solid olefinic thermoplastic elastomer.

13. The seal for a vehicle as set forth in claims 12, wherein said seal lip includes a contact portion that slidably contacts said glass, wherein said contact portion of said seal lip is made of an olefinic thermoplastic elastomer, and wherein said contact portion is integrated with rubber forming said seal lip by coextrusion.

14. The seal for a vehicle as set forth in claim 9, wherein said movable member includes a door with a door frame, wherein said opening is a door opening, wherein said seal is a door weather strip, wherein said seal portion of said door weather strip pressively contacts said inner edge surrounding said door opening and is made of EPDM sponge rubber, and wherein said base portion of said door weather strip has a support portion for supporting said seal portion on said outer edge of said door, said support portion being made of a solid olefinic thermoplastic elastomer.

15. The seal for a vehicle as set forth in claim 14, wherein said support portion is secured to said outer edge of said door by one of a retainer, a fastener, and an adhesive.

* * * * *

UNITED STATES PATENT AND TRADEMARK OFFICE
CERTIFICATE OF CORRECTION

PATENT NO.     : 6,487,820 B1
DATED          : December 3, 2002
INVENTOR(S)    : Takao Nakajima et al.

Page 1 of 1

It is certified that error appears in the above-identified patent and that said Letters Patent is hereby corrected as shown below:

<u>Title page,</u>
Item [30], correct the first Foreign Application Priority Date "Mar. 30, 1999" to be -- Sept. 30, 1999 --

Signed and Sealed this

Ninth Day of September, 2003

JAMES E. ROGAN
*Director of the United States Patent and Trademark Office*